(12) United States Patent
Durham

(10) Patent No.: US 6,601,859 B2
(45) Date of Patent: Aug. 5, 2003

(54) VERTICALLY FOLDING HAND TRUCK AND METHODS OF ITS OPERATION AND CONSTRUCTION

(75) Inventor: Stephen P. Durham, Omer, MI (US)

(73) Assignee: Magline, Inc., Pinconning, MI (US)

( * ) Notice: Subject to any disclaimer, the term of this patent is extended or adjusted under 35 U.S.C. 154(b) by 6 days.

(21) Appl. No.: 09/902,435

(22) Filed: Jul. 10, 2001

(65) Prior Publication Data

US 2002/0008367 A1 Jan. 24, 2002

Related U.S. Application Data

(60) Provisional application No. 60/218,704, filed on Jul. 17, 2000.

(51) Int. Cl.$^7$ ................................. B62B 1/04
(52) U.S. Cl. ............................. 280/47.131; 280/47.23; 280/655
(58) Field of Search .................. 280/655, 655.1, 280/651, 639, 47.131, 47.23, 47.24, 47.315, 47.34

(56) References Cited

U.S. PATENT DOCUMENTS

| | | | |
|---|---|---|---|
| 639,338 A | 12/1899 | Barns | |
| 1,627,253 A | 5/1927 | Shannon | |
| 2,806,708 A | * 5/1957 | Finstad | 280/36 |
| 3,052,484 A | * 9/1962 | Huffman et al. | 280/36 |
| 3,172,680 A | 3/1965 | Hire | |
| 3,177,000 A | 4/1965 | Alexander | |
| 3,785,669 A | 1/1974 | Doheny | |
| 3,788,659 A | * 1/1974 | Allen | 280/5.24 |
| 3,907,322 A | * 9/1975 | Kiryu | 280/36 C |
| 3,997,182 A | 12/1976 | Mortenson | |
| 4,185,853 A | 1/1980 | Thurmond | |
| 4,253,546 A | 3/1981 | Uchida | |
| 4,448,440 A | 5/1984 | Gier | |
| 4,561,674 A | 12/1985 | Alessio | |
| 4,563,014 A | 1/1986 | Mortenson | |
| 4,637,626 A | 1/1987 | Foss et al. | |
| 4,679,817 A | 7/1987 | Schufer | |
| 4,790,547 A | 12/1988 | Mortenson | |
| 4,802,681 A | 2/1989 | Hung | |
| 4,921,270 A | * 5/1990 | Schoberg | 280/655.1 |
| 4,934,485 A | 6/1990 | Purkapile | |
| 4,969,660 A | 11/1990 | Spak | |
| 5,072,958 A | 12/1991 | Young | |
| 5,348,325 A | * 9/1994 | Abrams | 280/40 |
| 5,393,081 A | 2/1995 | Mortenson | |
| 5,414,895 A | 5/1995 | Kazmark | |
| 5,536,034 A | 7/1996 | Miller | |
| 5,544,910 A | 8/1996 | Esposito | |
| 5,549,317 A | 8/1996 | Dunkle | |
| 5,564,720 A | 10/1996 | Stringer | |
| 5,577,745 A | 11/1996 | Birk | |
| 5,626,352 A | 5/1997 | Grace | |
| 5,941,543 A | 8/1999 | Kazmark | |
| 5,993,314 A | 11/1999 | Dannenberg et al. | |
| 6,019,381 A | 2/2000 | Krawczyk | |

\* cited by examiner

Primary Examiner—Lesley D. Morris
Assistant Examiner—Tony Winner
(74) Attorney, Agent, or Firm—Reising, Ethington, Barnes, Kisselle & Learman, P.C.

(57) ABSTRACT

A dual wheel foldable hand truck with a nose plate has a skeletal frame including laterally spaced vertical side rails. The frame has hingedly connected upper and lower frame sections with upper and lower side rails meeting at side rail interfaces. Handle operated lock slides are carried by the upper rail sections for downward sliding movement to releasably lock the frame sections in planar alignment. The foldable nose automatically locks in operative position when swung down from stowed position.

18 Claims, 11 Drawing Sheets

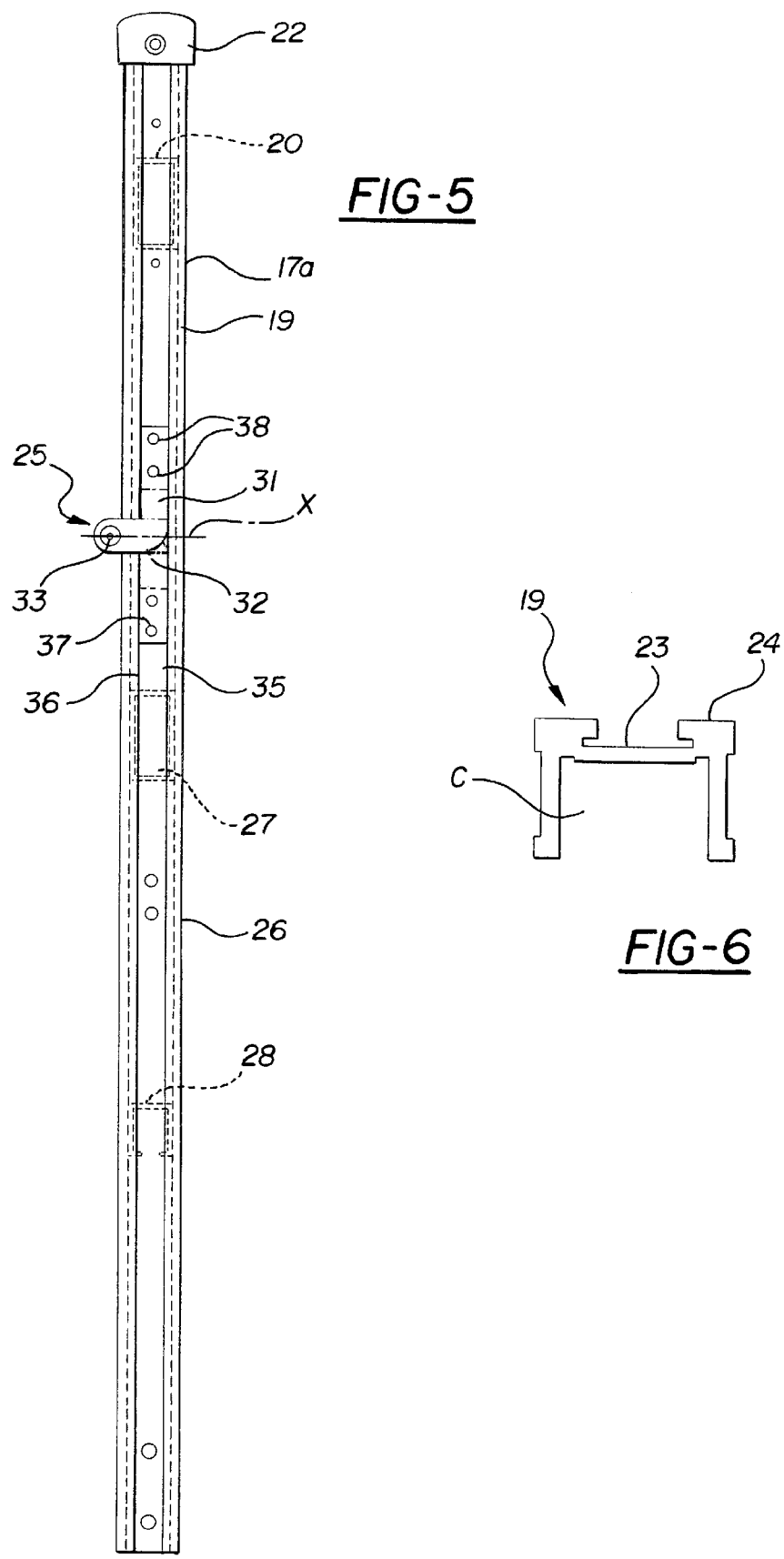

VERTICALLY FOLDING HAND TRUCK AND METHODS OF ITS OPERATION AND CONSTRUCTION

This application claims the priority of U.S. provisional application Serial No. 60/218,704, filed Jul. 17, 2000. The present application relates to hand trucks of the type employing a vertically extending skeletal frame and a forwardly extending nose plate upon which myriad and varied products may be supported for ready transport. Hand trucks of this character are characterized by providing a pair of wheels on a dead axle at the lower end of the frame rearwardly of the nose plate.

BACKGROUND OF THE INVENTION

Hand trucks of the type mentioned have been well described in a number of prior patents such as the present assignee's U.S. Pat. Nos. 3,997,182, 4,563,014, 4,790,547, and 5,393,081, for example, all of which I incorporate herein by reference. Such hand trucks are utilized for moving a variety of products such as stacked cases of soft drinks or beer to and from a delivery truck for transporting them from warehouses to retail establishments, for example. Typically, the hand trucks will be stored in the delivery vehicle during transport and then put into use when the various destinations are reached.

SUMMARY OF THE INVENTION

The present invention is concerned with a vertically folding hand truck comprising upper and lower sections which are hingedly connected to permit the upper section to be folded vertically down to a position of vertical adjacency with the lower section. This is accomplished in the present hand truck without the sacrifice of strength and rigidity when the hand truck is in use by employing an internal locking mechanism disposed within the frame side rails for securely locking the sections in vertically co-extensive position. Mechanism is also provided for pivotally mounting the nose plate for movement to a vertical position and securely and rigidly locking it in the horizontal position of use automatically when the nose plate is swung down from the stowed position.

One of the prime objects of the present invention is to provide a hand truck of the character described which has relatively few operating parts and can be manufactured and marketed economically.

Another object of the invention is to provide a lightweight foldable hand truck of very durable construction which requires virtually no maintenance and can be readily and easily locked in operative position.

A still further object of the invention is to provide a foldable hand truck having parts which can be readily unlocked to enable the truck to assume a compacted position for ready storage.

Other objects and advantages of the invention will become apparent with reference to the accompanying drawings and descriptive matter.

BRIEF DESCRIPTION OF THE DRAWINGS

The presently preferred embodiment of the invention is disclosed in the following description and in the accompanying drawings, wherein:

FIG. 5 is an exterior side elevational view thereof;

FIG. 6 is an enlarged end elevational view of the side rails in both the upper and lower frame sections;

DETAILED DESCRIPTION OF THE DRAWINGS

Figure 1:
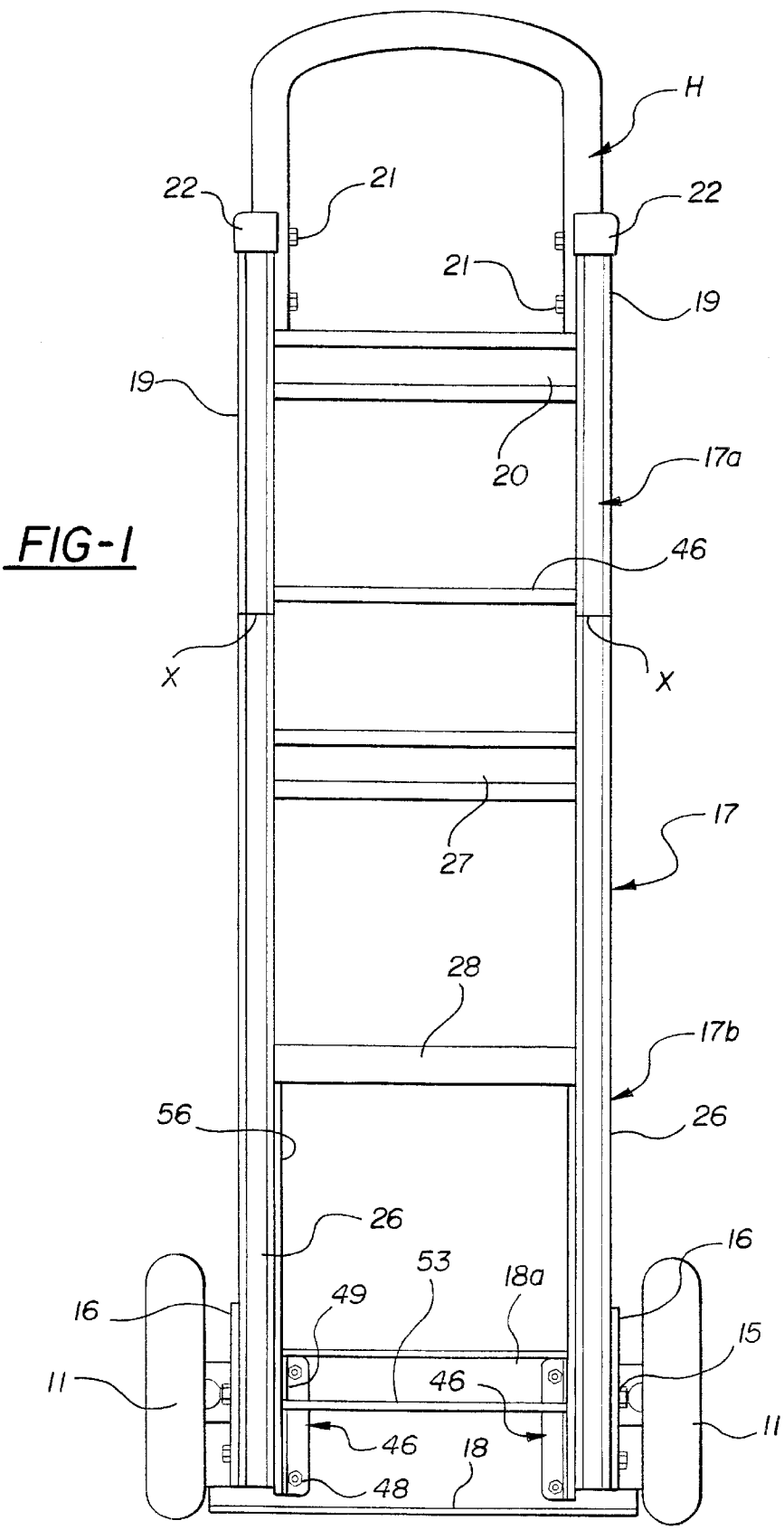
FIG. 1 is a front elevational view of the hand truck shown in its operative position, certain parts being omitted in the interest of clarity.

Referring now more particularly to the drawings mentioned, the hand truck is shown as comprising preferably rubber-tired wheels, generally designated 10, which may comprise laterally spaced apart tires 11 mounted on rims 12 having flanged central hub portions 12a, supporting bearing sleeves 13, within which are bearings rotatably supporting the wheels 10 for travel on dead axle 15.

The axle 15 fixedly carries brackets 16 which secure to the lower end of a generally rectangular, load carrying, main frame, generally designated 17, which comprises a two-piece generally rectangular skeletal structure mounting a handle H at its upper end. As will become apparent, the overall frame 17 comprises a normally co-extensive upper frame portion 17a and a lower frame portion 17b abutting at an interface "x" and it is to the lower frame 17b that the brackets 16 are mounted. It is also to the lower frame section 17b that the foldable load supporting load support member or nose 18 is pivotally connected in a manner which will presently be more specifically described.

The upper frame section 17a includes generally channel-shaped side rail sections generally designated 19 with the open channels C of the sections facing laterally inwardly to receive the ends of a brace member 20, which is secured in position by suitable fasteners 20a. The lower ends of handle H are also received within the channel members 19 and may be secured by fasteners 21. Also provided for the upper ends of the side rails 19 are plastic guard fittings 22 which may be held in position by the fasteners 21. It will be noted that the front faces of the channel members 19 are shallowly grooved as at 23 and that the grooved or recessed portions 23 are bordered by vertical lip portions 24. The upper frame section 17*a* is hingedly connected to the lower frame section 17*b* by hinge members, generally designated 25, which will presently be described.

Figure 4:
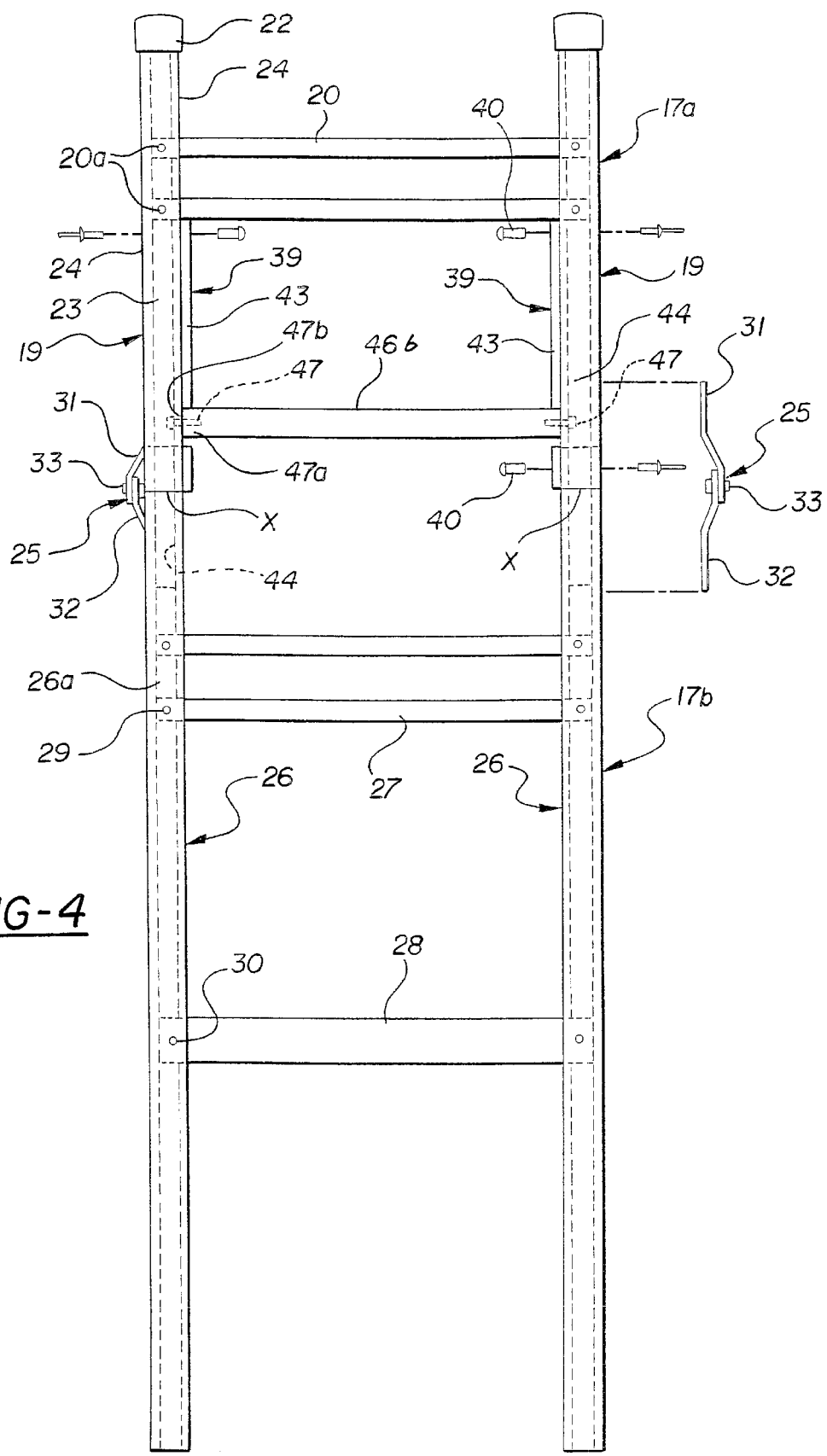
FIG. 4 is a slightly enlarged front elevational view of the two-part frame only in vertically aligned position, the hinge uniting the two-frame sections being shown in removed position at one side of the frame.
Figure 7:
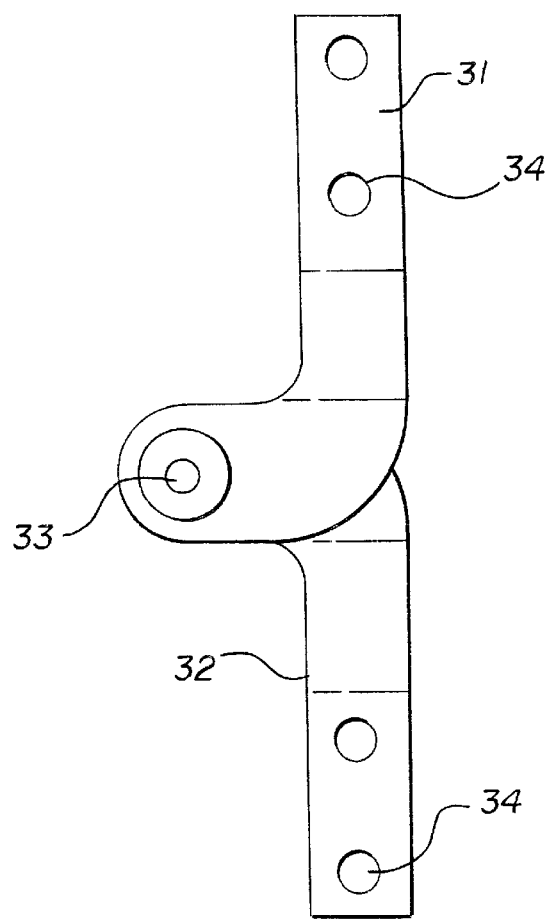
FIG. 7 is an enlarged side elevational view of a typical hinge, illustrating its structure and showing it in the position of extension.
Figure 8:
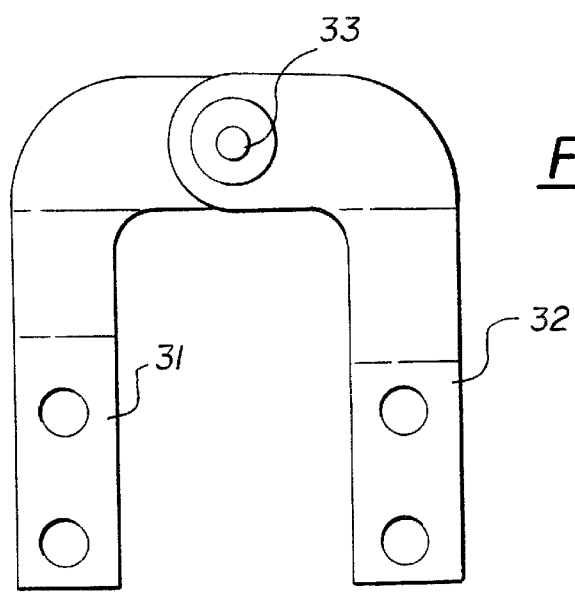
FIG. 8 is a similar view showing the folded position of the hinge.
Figures 9, 10:
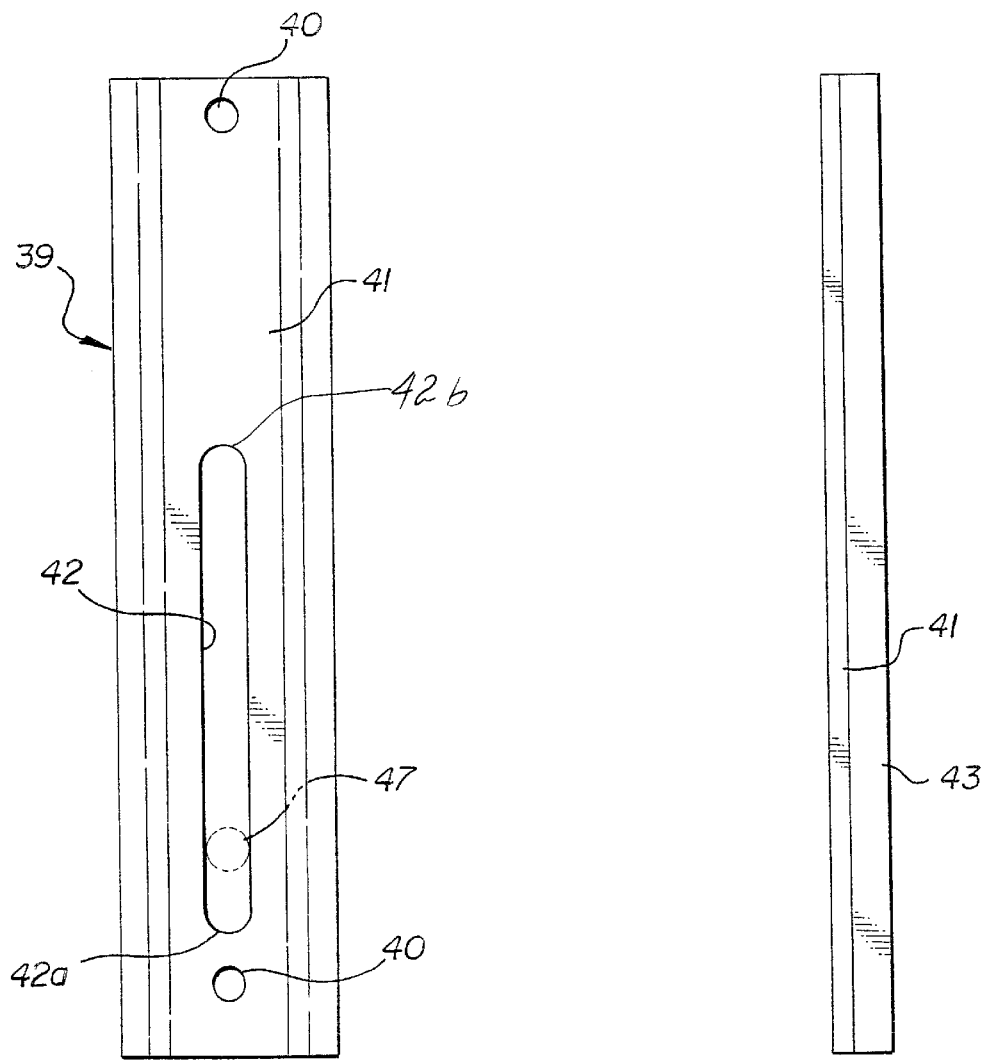
FIG. 9 is an enlarged face elevational view of one of the slide support extrusions fixed on each interior side of the upper frame side rails.
FIG. 10 is an edge elevational view thereof.

It will be seen that the lower frame section 17*b* comprises a like pair of channel-shaped side rails generally designated 26 which similarly are disposed in laterally opposed disposition with their channels C facing inwardly to receive brace members 27 and 28, which may be secured by fasteners 29 and 30, respectively. As FIGS. 4, 7 and 8 illustrate, each of the hinges 25, which may be referenced as left-hand hinges and right-hand hinges, include a pair of hinge legs 31 and 32, pivotally secured together by a suitable pin 33. The hinge legs 31, which are received in the side rail recesses 23, may be secured in the recesses 23 by fasteners 34 and the hinge legs 32, received within the like exterior recesses 35 provided in the side rails 26 which are bordered by vertically extending lips 36, may be secured by fasteners 37.

Figure 11:
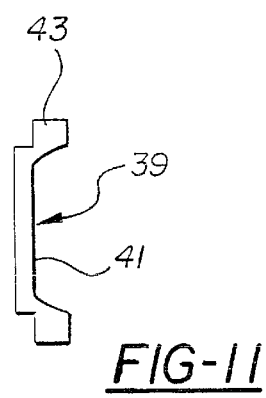
FIG. 11 is an end elevational view of the extrusion depicted in FIG. 10.
Figure 12:
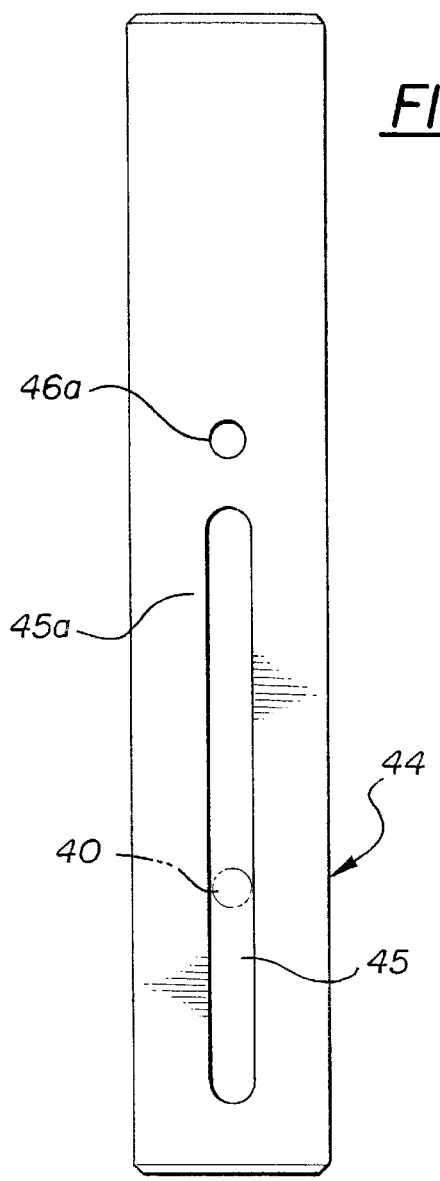
FIG. 12 is an enlarged face elevational view of one of the lock slides which are carried for vertical movement within the support extrusions.
Figure 13:
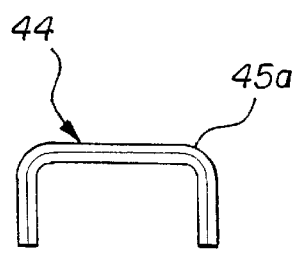
FIG. 13 is an end elevational view thereof.

Fixed to the inner side of each of the side rails 19 of the upper frame section 17*a* are support extrusions (see FIGS. 4, 4A, 9–11), generally designated 39, which may be secured by fasteners 40 extending through openings 40*a* into side rails 19. As FIG. 11 well indicates, the members 39 comprise sidewisely disposed webs 41 having elongate guide slots 42 with lower and upper end stop surfaces 42*a* and 42*b* respectively. Side ribs 43 engage the edges of the front and rear walls of the side rails 19 to brace the extrusion members 39 in position. Mounted sidewisely behind the support extrusions 39 are U-shaped lock slide members or parts 44 (see FIGS. 4A, 12 and 13) having slots 45 in walls 45*a* facing the slots 42 in the extrusion members 39. The slots 45 receive the lower fastener pins 40 provided for securing the lower end of support extrusions 39 in fixed position to each side rail 19 and are guided thereby when the lock slides 44 are moved upwardly and downwardly. Upward movement of the slides 44 may be limited by the slots 42 or 45.

Provided as a frame spanning handle to move the lock slides 44 upwardly and downwardly in unison is a rod member 46*b* which has end pins 47 with shank portions 47*a* fixed in openings 46*a* in the slides 44 and riding in the support extrusion guide slots 42. When the lock slides 44 are in their lowermost position as indicated in FIGS. 4 and 4A, they are received within the upper ends of the side rails 26 of the lower frame section 17*b* and prevent the upper frame section 17*a* from being pivoted downwardly relative to the lower section 17*b* to the position shown in FIG. 3.

Figure 17:
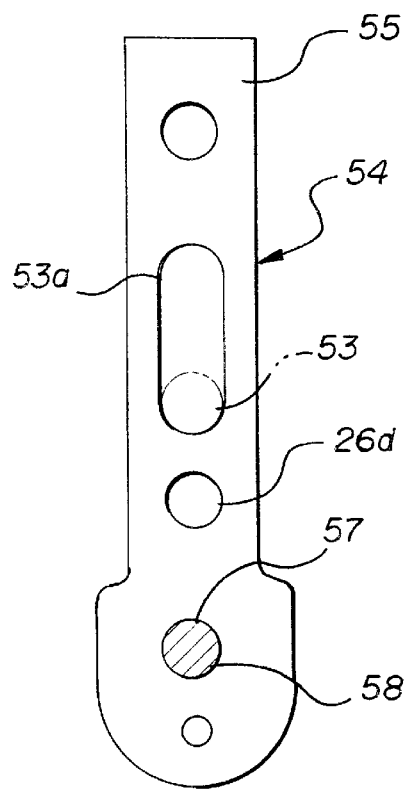
FIG. 17 is a face elevational view of one of the mount brackets fixed to the lower ends of the lower frame section side rails to pivotally support the nose plate.
Figure 14:
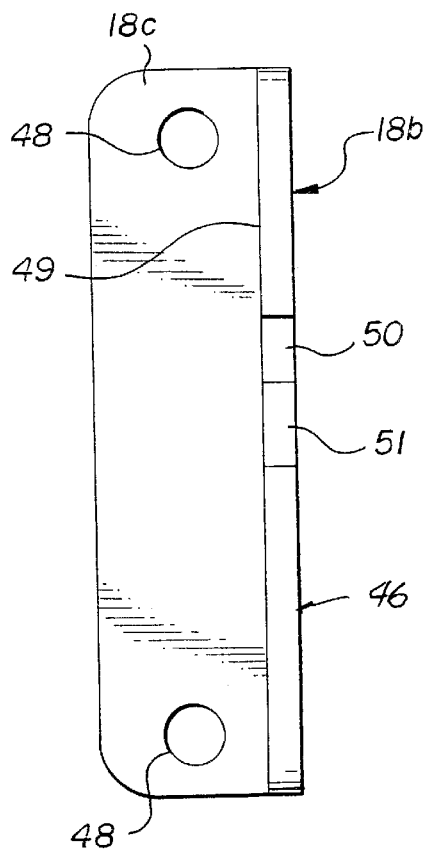
FIG. 14 is an enlarged front elevational view of one of the folding nose mounting brackets.
Figure 15:
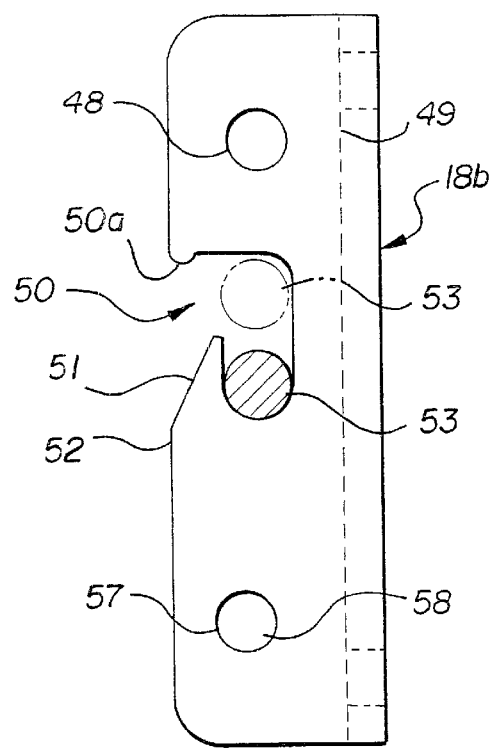
FIG. 15 is a side elevational view thereof.
Figure 16:
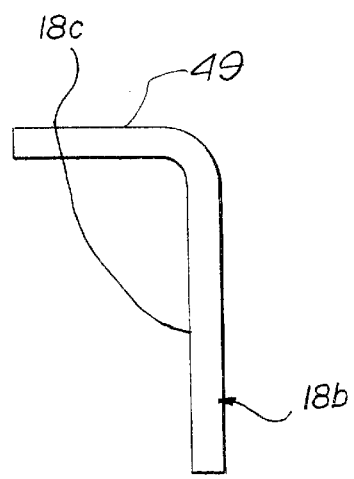
FIG. 16 is an end elevation view thereof.
Figure 18:
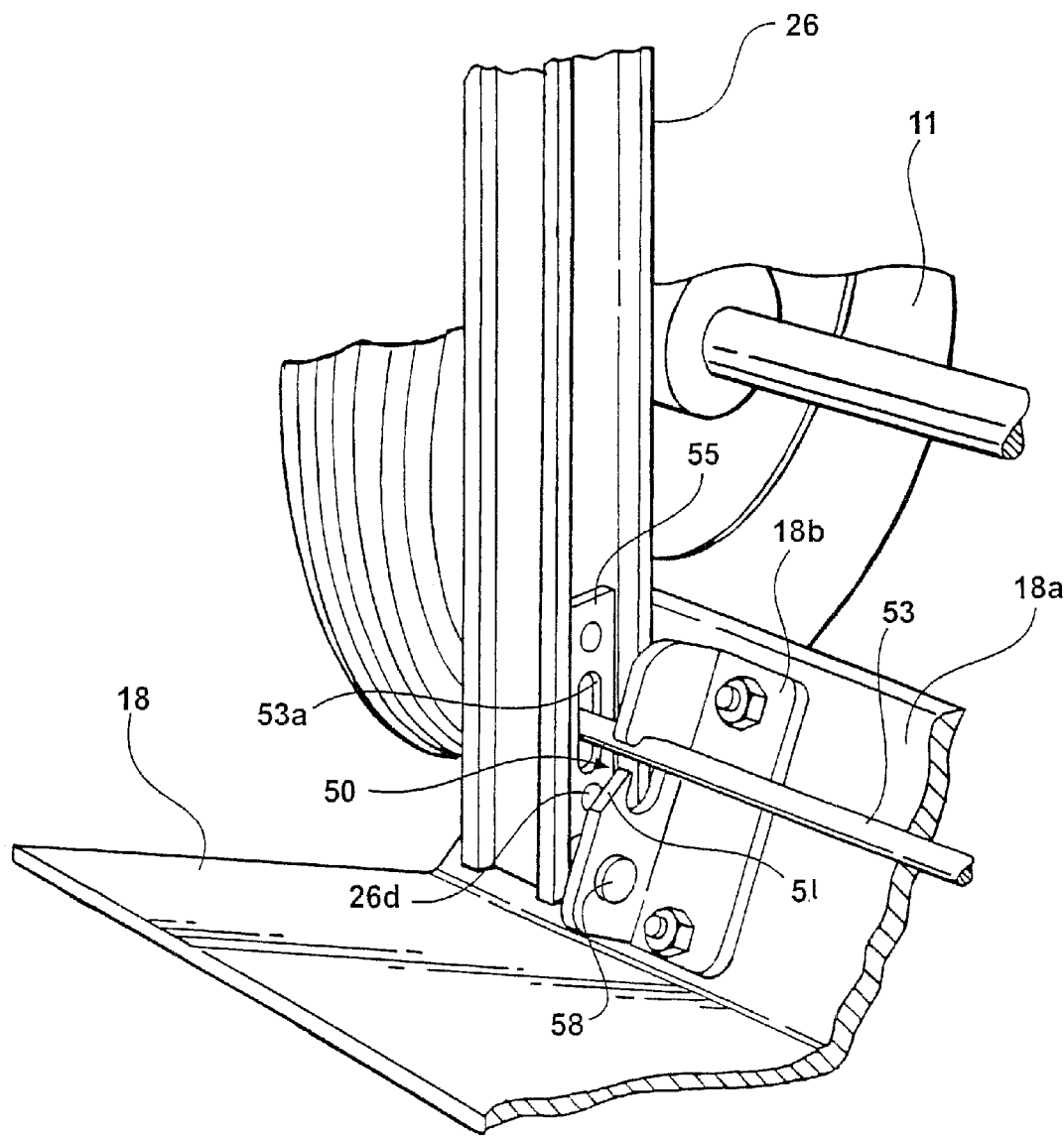
FIG. 18 is a front perspective view of the nose plate locking mechanism.

It will be seen that the nose plate or member 18 has an integral back plate 18*a*. Mounted to the front face of back plate 18*a* are a pair of angle shaped lock brackets 46, collectively generally designated 18*b* in FIGS. 1 and 14–16. The back plate 18*a* mount brackets 46 each include a base portion 18*c* which rigidly secures to the back plate 18*a*, as with fasteners 48, in a position to leave each locking wall 49 of a bracket 46 (FIGS. 1 and 14) extending forwardly when the nose plate or member 18 extends forwardly. As FIG. 15 particularly shows, each wall 49 is provided with a cut-out or recessed portion, generally designated 50, which includes an access portion formed by a top lip 50*a* and an inclined piloting or camming wall 51, leading to a downwardly extending vertical slot 52. A rod 53 has its ends captured in the slot 52 in its lowered position, but is freely vertically raisable to the position shown in chain lines in FIG. 15, which is free of the slots 52. When the rod 53 is in the lowermost position, shown in solid lines in FIG. 15, the nose plate 18 is firmly locked in the operative position. A pivot supporting bracket plate, disclosed in FIG. 17 and generally indicated at 54, is fixed inside the lower end of each side rail 26 on its laterally interior side to aid in journaling the nose plate 15 for swinging movement. Plates 54 include guide slots 53*a* within which the ends of locking rod 53 are received. They may be fixed in position on rails 26 by fasteners 55*b*. The plates 54 are disposed within the recesses of channel members 56 secured to each of the side rails 26 and have bores 57 to receive the nose plate pivot pins 58 which fix to the brackets 18*b* fixed to nose plate 18. Belleville washers (not shown) may be suitably provided on the pins 58 to exert a resilient frictional pressure between the members 46 and 54 to hold the nose plate in the folded raised position.

THE OPERATION

When operative and in use, the nose plate 18 is in the down position with rod 53 received in the locking slots 52 and maintained there by gravity. The very ends of the rod 53 can travel freely upwardly in the slots 53*a* shown in FIG. 16 when rod 53 is raised. When it is desired to stow the hand truck in a compacted storage mode, the nose plate 18 can first be released to pivot upwardly to a vertical position flush with the side rails 26 by raising the rod 53 to the chain line position shown in FIG. 15 in which it is no longer captured in the slots 52. The nose plate 18 is then grasped by its front horizontally disposed edge and pivoted upwardly and rearwardly. The back plate 18*a* and the locking members or locks 18*b* pivot rearwardly with the rod 53 removed from the slots 50 so that full swinging movement of the nose plate 18 to stowed position can be effected. The spring washers provided on pins or pivot posts 58 hold the nose plate in this vertical position.

Figure 3:
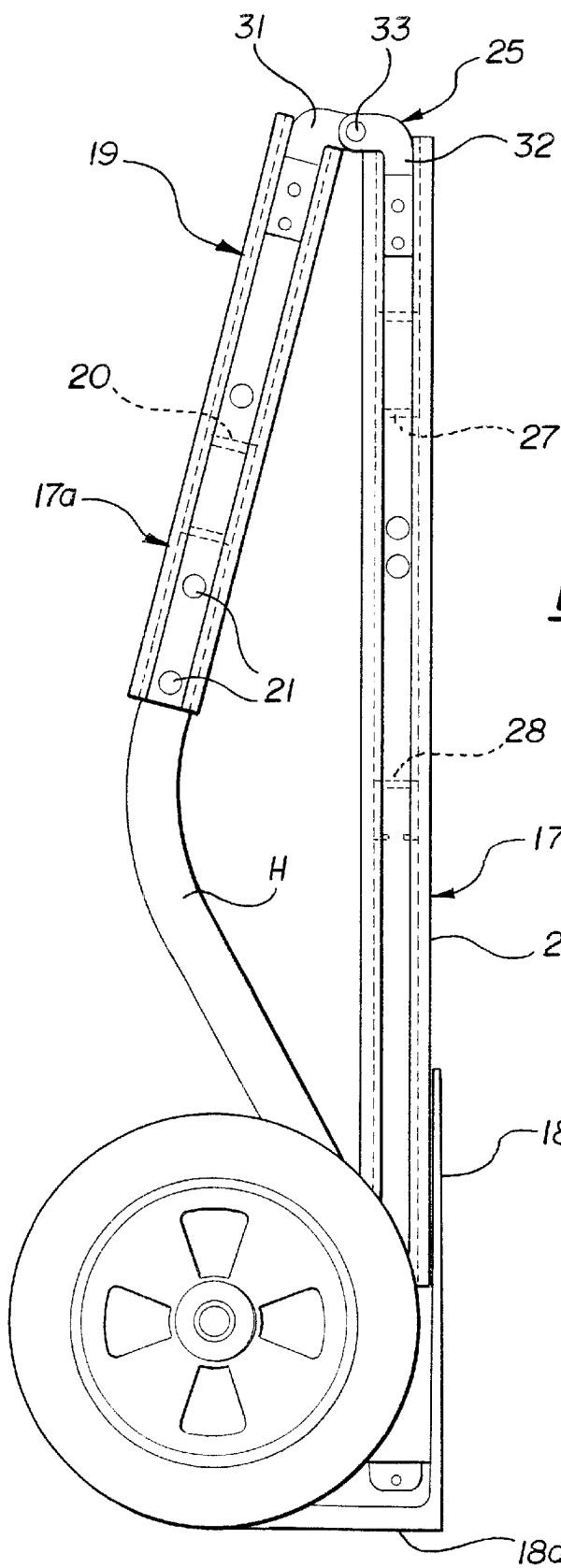
FIG. 3 is a slightly enlarged side elevational view showing the hand truck in folded position ready for compact storage.
Figure 4A:
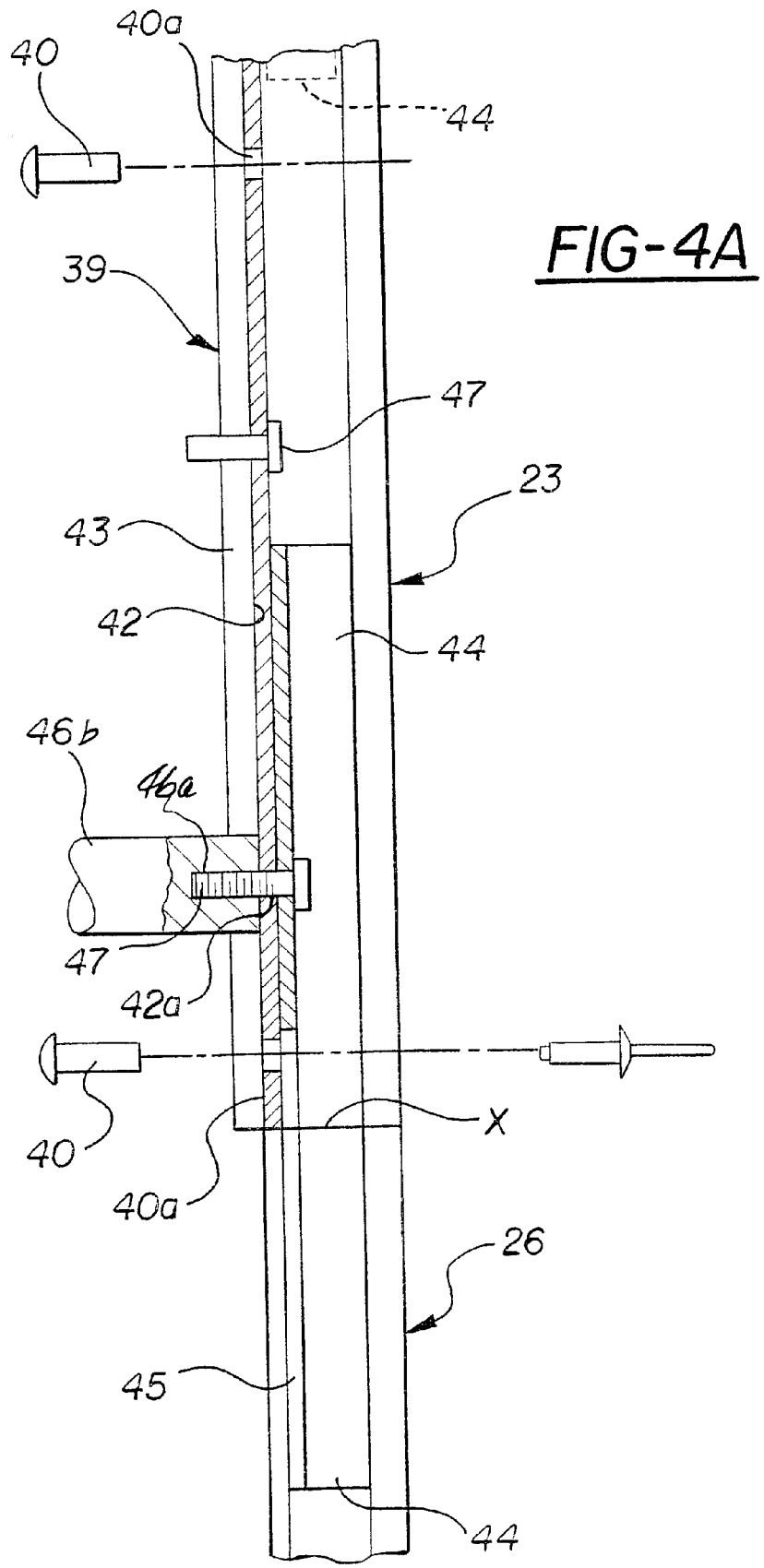
FIG. 4A is an enlarged fragmentary sectional front elevational view of a portion of the frame illustrated in FIG. 4.

To fold the handle H and upper frame section rearwardly to the FIG. 3 position, the rod member 46 is raised until the lock slides 44 are raised to a position within the upper frame section 17*a* clear of the lower frame section. Because of the rearward position of hinge pivots 33, handle H can then be swung rearwardly with suitable clearance to the folded down position shown in FIG. 3. The weight of the upper section and handle will be sufficient to maintain the upper frame section 17*a* in the FIG. 3 position.

Figure 2:
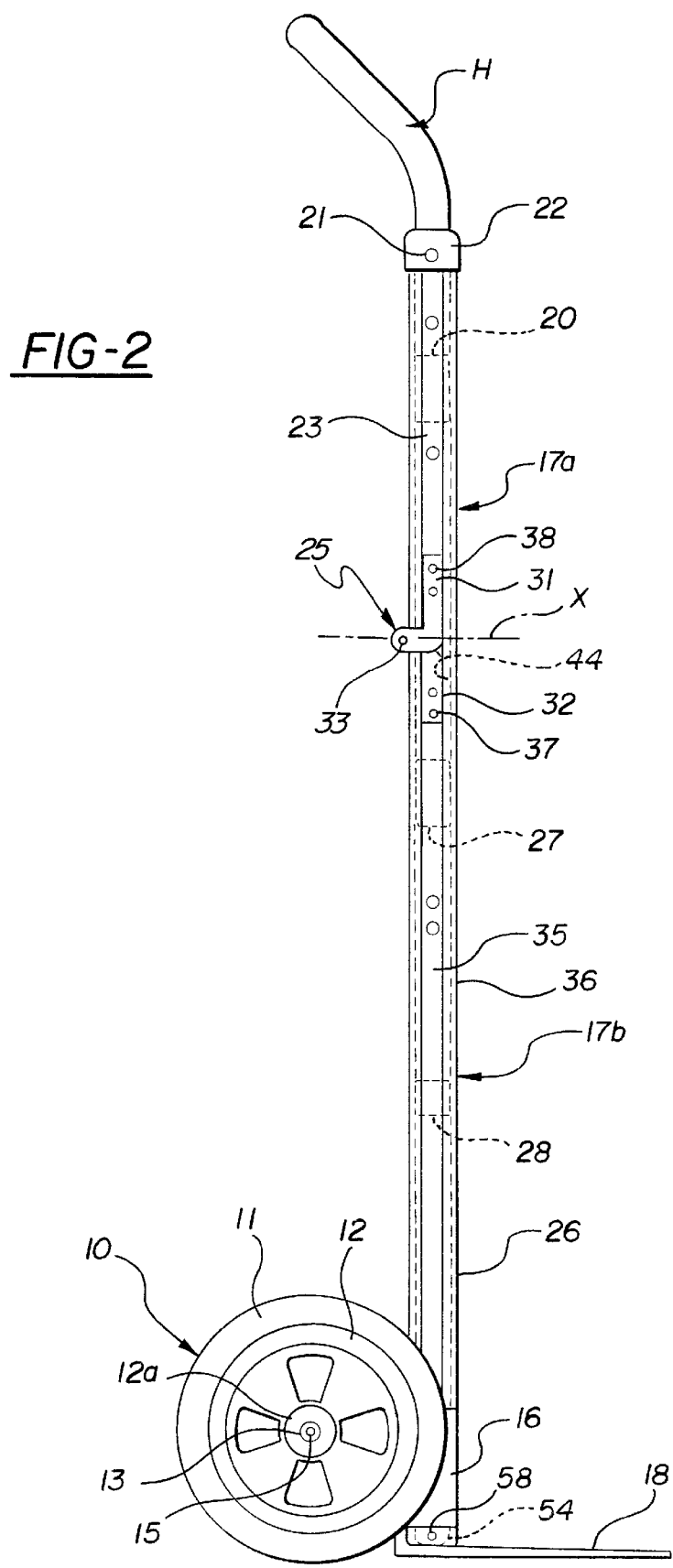
FIG. 2 is a side elevational view thereof.

To restore the upper frame section to the FIGS. 1 and 2 position, it is merely necessary to grasp the handle H and fold the upper frame section up into vertical alignment with the lower frame section. The locking rod handle 46*b* can then be moved downwardly with the aid of gravity to slide the lower ends of the lock slides 44 downwardly into the upper ends of the side rail members 26. The slides 44 freely move downwardly toward locked position until halted in locked position by member 47 reaching the lower stop ends of slots 42 because the locks 45 can travel downwardly relative to the lower fasteners 40. For rigidity purposes, the rod 46*b* is moved to its lowermost position in which substantial lengths of the lock plates 44 are received and closely confined in the upper ends of side rails 26. The slots 42 function as elongate vertical guides for the shanks of pins 47 and the slots 45 do likewise for the lower fastener pin shanks 40. Both mechanisms may function as guide mechanism interacting between the upper frame rail section and the lock slides 44. The lower ends of slots 42 also provide and function as stop surfaces, as indicated.

To restore the nose plate to operative position, it is merely necessary to grasp the front edge of the horizontal portion of nose plate 18 and pivot it downwardly. As the back plate 18*a* of the nose plate swings forwardly and upwardly, the inclined camming walls 51 of the brackets 18*b* engage the ends of rod 53 (carried in slots 53*a*) to automatically vertically raise the rod 53 to a position in which its ends are disposed above the slots 52 and can descend under the influence of gravity in the slots 52 to be captured in the locked position. The brackets 18*b* and rod 53 function as interacting lock mechanism to lock the nose plate 18 in operative position.

In constructing the present vertically foldable hand truck, standard hand truck side rail extrusions are utilized and simply cut in half. The hinge members 25 are then mounted in position along with the fitting 39 and lock plate 44 sub-assemblies which include the lock rod 46*b* fastener members 47 extending through the slots 42. The lower end of the lower frame section 17*b* is then changed by adding the lock brackets 18*b* to nose 18 and the lock rod 53 which is receivable in the slots 52 provided therein. The members 54 and 56 are, of course, installed first of all.

It is to be understood that the embodiment described is exemplary of various forms of the invention only and that the invention is defined in the appended claims which contemplate various modifications and embodiments within the spirit and scope of the invention.

I claim:

1. A hand truck comprising:
   a. a skeletal generally vertically disposed frame including side rails with front and rear sides, exterior sides, and interior sides connected by generally laterally extending braces, said frame having separated upper and lower frame sections with upper and lower side rail sections meeting at side rail interfaces;
   b. a pair of wheels connected to said lower frame section rearwardly of said lower side rail sections;
   c. a load support nose member connected to said lower frame section having an operative position extending generally horizontally forwardly from said lower frame section;
   d. hinges connecting said upper frame section to said lower frame section for relative folding movement from a first operative position in which said upper and lower side rail sections are generally vertically aligned to a folded-down stowed position in which said side rail sections are in front to rear lapping relationship, said hinges having lateral hinge pins rearward of said upper side rail sections, each said pin connecting a hinge member secured to the exterior side of said upper side rail section and a hinge member secured to the exterior side of said lower side rail section, said upper section of said frame folding down rearwardly to lie rearwardly of said lower section of said frame, and said nose member being pivotally mounted at the lower ends of said lower frame section side rails to swing upwardly to a stowed position adjacent the front sides of said lower frame section side rails from an operative forwardly extending position.
   e. handle operated lock slides carried by said upper rail sections for downward locking vertical sliding movement within said upper side rail sections from a first raised position vertically free of said lower rail sections to a second locking position extending past said interfaces into the upper ends of said lower rail sections to prevent relative folding movement of said upper and lower side rail sections; and
   f. stop surfaces carried by said lock slides interacting with said frame for limiting the downward, gravity assisted locking travel of said lock slides beyond said locking position.

2. The hand truck of claim 1 wherein said stop surfaces interact with said upper frame section.

3. The hand truck of claim 1 wherein said nose member comprises a load support member with an angularly extending back plate, lock bracket mechanism is carried on the nose support member back plate and has forwardly facing access openings leading rearwardly to a nose locking slot which extends downwardly when said nose member is in operative position, and said lower frame section carries a laterally extending nose lock part movable from a locked position within said nose locking slot on the nose member to a raised position above said slot permitting said nose plate to swing forwardly out away from under said lock part in folding to stowed position.

4. The hand truck of claim 3 wherein said nose lock part comprises a laterally extending rod, brackets with vertically extending slots mount on said interior sides of said lower frame section side rails near the lower ends thereof, and the ends of said rods extend through said slots and are rideable vertically therein.

5. The hand truck of claim 4 wherein said access openings have piloting surfaces leading to said nose locking slots positioned to engage said nose locking rod when said nose member is swung down from stowed to operative position and move said rod to a position in which it is automatically deposited in said nose locking slot carried on the nose member and locks said nose member in generally horizontal operative position.

6. A hand truck comprising:
   a. a generally vertically disposed frame including laterally spaced side rails with front and rear sides, exterior sides, and interior sides connected by generally laterally extending braces;
   b. an axle mounting a pair of wheels connected to carry said side rails;
   c. a load support nose member connected to the lower end of said frame having an operative position extending generally horizontally forwardly from said frame;
   d. pivots mounting said nose member for upward swinging movement from said operative position to a vertical position substantially folded against said front sides of said side rails;
   e. a backer member for said nose member extending generally vertically angularly thereto; and
   f. manually releasable latch and slot lock mechanism carried on said backer member and on the lower end of said frame including a slot provided on one of said backer member and frame and a lock provided on the other of said backer member and frame engaged to automatically lock when said nose member is swung down from stowed position to operative position to automatically lock said nose member in operative position.

7. The hand truck of claim 6 wherein said nose member comprises a load support part with a perpendicularly extending back plate constituting said backer member, and said lock mechanism includes a lock bracket mechanism carried on the nose support member back plate having openings leading rearwardly to a nose locking slot which extends downwardly when said nose member is in operative position, and said lower frame section carries a laterally extending nose lock rod constituting said latch movable from a locked position within said nose locking slot to a raised position above said slot permitting said lock bracket mechanism to swing forwardly out away from under said rod when said nose member is swung to stowed position.

8. The hand truck of claim 7 wherein brackets with vertically extending slots mount on said interior sides of said side rails, and the ends of said rod extend through said slots and are rideable vertically therein.

9. The hand truck of claim 6 wherein openings provided as part of said lock mechanism have piloting surfaces leading to nose locking slots positioned to engage a nose locking rod constituting said latch when said nose member is swung down from stowed to operative position and automatically move said rod to a position in which it is deposited in said nose locking slots and locks said nose member in generally horizontal operative position.

10. A hand truck comprising:
  a. a skeletal, generally vertically disposed frame including channel side rails with front and rear sides, exterior sides, and open interior sides connected by generally laterally extending braces, said frame having separated upper and lower frame sections with upper and lower side rail sections meeting at laterally aligned hinging interfaces;
  b. a pair of wheels connected to said lower frame section to lie rearwardly of said lower side rail section;
  c. a load support nose member connected to said lower frame section having an operative position extending generally horizontally forwardly from said lower frame section;
  d. pivots mounting said nose member for upward swinging movement from said operative position to a vertical position substantially folded against said front sides of said lower frame section side rails;
  e. a back plate for said nose member extending generally perpendicularly thereto;
  f. manually releasable slot and rod lock mechanism carried on said back plate and lower side rail sections automatically engaged when said nose member is swung down from stowed position to operative position to lock said nose member in operative position;
  g. said slot and rod lock mechanism including lock bracket mechanism carried on the nose support member back plate having at least one forwardly facing access opening leading rearwardly to a nose locking slot which extends downwardly when said nose member is in operative position, and also including a laterally extending nose lock rod carried on said lower frame section movable from a locked position within said nose locking slot on said nose member to a raised position above said slot permitting said nose bracket mechanism to swing forwardly out away from under said rod as said nose member is folding to stowed position;
  h. hinges connecting said upper frame section from a first operative position in which said upper and lower frame sections are vertically aligned to a folded-down stowed position in which said upper frame section is behind said lower frame section; and
  i. lock slides within said upper side rail section connected with a handle rod extending generally laterally between said upper side rail sections and carried for movement from a first raised position vertically free of said lower rail sections to a second vertically defined lower locking position downwardly beyond said interfaces to prevent relative folding movement of said upper and lower rail sections.

11. The hand truck of claim 10 wherein brackets with generally vertically extending slots mount on said interior sides of said channel shaped lower frame section side rails near the lower ends thereof, and the ends of said rod extend through said slots and are rideable vertically therein, and wherein said access opening has a piloting surface leading to said nose locking slot positioned to engage said locking rod when said nose member is swung down from stowed to operative position and automatically move said rod to a position in which it is deposited in said nose locking slot on the nose member and locks said nose member in generally horizontal operative position.

12. In a hand truck having a skeletal generally vertically disposed frame including channel side rails with front and rear sides, exterior sides, and open interior sides connected by generally laterally extending braces, said frame having separated upper and lower sections with upper and lower side rail sections meeting at laterally aligned interfaces, the improvement comprising:
  a. hinging devices carried on said side rail sections and connecting said rail sections for relative hinging movement from a first generally vertically aligned operative position to a folded down stowed position in which said frame sections are in front to rear lapping relationship;
  b. support guide plates spanning and fixed to said open laterally interior sides of said channel side rails, and having elongate vertical guide slots therein providing vertical guide surfaces; and
  c. rigid, non-hinged lock parts for said upper and lower frame sections carried within said side rail channels and having laterally inwardly projecting parts movable in engagement with said guide surfaces on said guide plates from a position removed from said interface to a projected position spanning said interface and blocking said relative hinging movement of said upper and lower rail sections.

13. The hand truck of claim 12 wherein said lock parts comprise lock slides and said guide slots have lower ends defining locking stop surfaces for said slides.

14. The hand truck of claim 13 wherein laterally inwardly projecting parts on said lock parts are connected by a laterally extending handle disposed laterally between said upper side rail sections.

15. The hand truck of claim 14 wherein said lock slides have vertically extending slide slots therein and fasteners for securing said guide plate to said rail sections extend through said lock slide slots and further guide said lock slides in their sliding movement.

16. The hand truck of claim 12 wherein said hinging devices mount said upper frame section for folding movement to a position rearward of said lower frame section.

17. A method of constructing a hand truck having a skeletal generally vertically disposed frame including side rails with front and rear sides, exterior sides, and interior open sides connected by generally laterally extending braces, said frame having separated upper and lower frame sections with upper and lower side rail sections meeting at side rail interfaces; a pair of wheels connected to said lower frame section rearwardly of said lower side rail sections; a load support nose member connected to said lower frame section having an operative position extending generally horizontally forwardly from said lower frame section; hinges connecting said upper frame section to said lower frame section for relative folding movement from a first operative position in which said upper and lower side rail sections are generally vertically aligned to a folded-down stowed position in which said side rail sections are in front to rear lapping relationship; comprising:
  a. providing guide plates on said open interior sides of said channel side rails having elongate vertical guide slots and further providing handle operated lock slides with parts guiding in said guide slots carried by said upper rail sections for downward locking vertical sliding movement within said upper side rail sections from a first raised position vertically free of said lower rail sections to a second locking position extending past said interfaces into the upper ends of said lower rail sections to prevent relative folding movement of said upper and lower side rail sections; and b. providing stop surfaces carried by said lock slides interacting with said frame for limiting the downward, gravity-assisted locking travel of said lock slides beyond said locking position.

18. A method of constructing a hand truck comprising a generally vertically disposed frame including laterally connected laterally spaced side rails with front and rear sides, exterior sides, and interior sides; an axle mounting a pair of wheels connected to carry said side rails; a load support nose member connected to the lower end of said frame having an operative position extending generally horizontally forwardly from said frame; pivots mounting said nose member for upward swinging movement from said operative position to a vertical stowed position substantially folded against said front sides of said side rails; and a back for said nose member extending generally angularly thereto; comprising a. providing a manually releasable latch and slot lock mechanism having parts carried on said back and on the lower ends of said side rails to automatically interact when said nose member is swung down from stowed position to operative position and automatically lock said nose member in operative position, one of said parts being a displaceable latch and the other of said parts being a memeber having a slot in which said latch is received.

* * * * *